United States Patent [19]

Hirasawa

[11] 3,878,986

[45] Apr. 22, 1975

[54] FULL ADDER AND SUBTRACTOR CIRCUIT

[75] Inventor: Masataka Hirasawa, Yokohama, Japan

[73] Assignee: Tokyo Shibaura Electric Co., Ltd., Kawasaki-shi, Japan

[22] Filed: July 9, 1973

[21] Appl. No.: 377,190

[30] Foreign Application Priority Data

July 10, 1972 Japan .............................. 47-68190
July 10, 1972 Japan .............................. 47-68191

[52] U.S. Cl. .............................................. 235/175
[51] Int. Cl. .............................................. G06f 7/385
[58] Field of Search .................... 235/175, 176, 173

[56] References Cited

UNITED STATES PATENTS

| | | | |
|---|---|---|---|
| 3,602,705 | 8/1971 | Cricchi et al. | 235/175 |
| 3,604,909 | 9/1971 | Vogel et al. | 235/175 |
| 3,612,847 | 10/1971 | Jorgensen | 235/175 |
| 3,679,883 | 7/1972 | Straub | 235/175 |
| 3,700,875 | 10/1972 | Saenger et al. | 235/175 |

*Primary Examiner*—Charles E. Atkinson
*Attorney, Agent, or Firm*—Oblon, Fisher, Spivak, McClelland & Maier

[57] ABSTRACT

A full adder and subtractor circuit comprises four logic units, wherein a first logic unit carries out a logic operation on first and second operands and on information of a preceding bit to provide an output of carry information; a second logic unit carries out a logic operation on said first and second operands, said information of the preceding bit and said output of the carry information providing a result of an arithmatic operation on the first and second operands; a third logic unit carries out a logic operation on the second operand, the output of the carry information and the information of the preceding bit providing an output of a borrow information, and a fourth logic unit carries out a logic operation on an operation instruction, the output of the carry information and said output of the borrow information providing information of a succeeding bit.

10 Claims, 6 Drawing Figures

| An | Bn | Cn-1 | Opn | $\overline{CARRYn}$ | $\overline{BORROWn}$ | A/Sn | C/Bn |
|---|---|---|---|---|---|---|---|
| 0 | 0 | 0 | 0 | 1 | 1 | 0 | 0 |
| 1 | 0 | 0 | 0 | 1 | 1 | 1 | 0 |
| 0 | 1 | 0 | 0 | 1 | 0 | 1 | 0 |
| 0 | 0 | 1 | 0 | 1 | 0 | 1 | 0 |
| 1 | 1 | 0 | 0 | 0 | 1 | 0 | 1 |
| 0 | 1 | 1 | 0 | 0 | 0 | 0 | 1 |
| 1 | 0 | 1 | 0 | 0 | 1 | 0 | 1 |
| 1 | 1 | 1 | 0 | 0 | 0 | 1 | 1 |
| 0 | 0 | 0 | 1 | 1 | 1 | 0 | 0 |
| 1 | 0 | 0 | 1 | 1 | 1 | 1 | 0 |
| 0 | 1 | 0 | 1 | 1 | 0 | 1 | 1 |
| 0 | 0 | 1 | 1 | 1 | 0 | 1 | 1 |
| 1 | 1 | 0 | 1 | 0 | 1 | 0 | 0 |
| 0 | 1 | 1 | 1 | 0 | 0 | 0 | 1 |
| 1 | 0 | 1 | 1 | 0 | 1 | 0 | 0 |
| 1 | 1 | 1 | 1 | 0 | 0 | 1 | 1 |

FIG. 5

| An | Bn | Cn-1 | Opn | $\overline{CARRYn}$ | $\overline{BORROWn}$ | A/Sn | C/Bn |
|---|---|---|---|---|---|---|---|
| 0 | 0 | 0 | 0 | 1 | 1 | 0 | 0 |
| 1 | 0 | 0 | 0 | 1 | 1 | 1 | 0 |
| 0 | 1 | 0 | 0 | 1 | 1 | 1 | 0 |
| 0 | 0 | 1 | 0 | 1 | 1 | 1 | 0 |
| 1 | 1 | 0 | 0 | 0 | 1 | 0 | 1 |
| 0 | 1 | 1 | 0 | 0 | 1 | 0 | 1 |
| 1 | 0 | 1 | 0 | 0 | 1 | 0 | 1 |
| 1 | 1 | 1 | 0 | 0 | 1 | 1 | 1 |
| 0 | 0 | 0 | 1 | 1 | 1 | 0 | 0 |
| 1 | 0 | 0 | 1 | 1 | 1 | 1 | 0 |
| 0 | 1 | 0 | 1 | 1 | 0 | 1 | 1 |
| 0 | 0 | 1 | 1 | 1 | 0 | 1 | 1 |
| 1 | 1 | 0 | 1 | 0 | 1 | 0 | 0 |
| 0 | 1 | 1 | 1 | 0 | 0 | 0 | 1 |
| 1 | 0 | 1 | 1 | 0 | 1 | 0 | 0 |
| 1 | 1 | 1 | 1 | 0 | 0 | 1 | 1 |

FIG. 6

FULL ADDER AND SUBTRACTOR CIRCUIT

BACKGROUND OF THE INVENTION

1. Field of the Invention

The present invention generally relates to a binary logic circuit for digital arithmatic operation and more particularly to a full adder and subtractor circuit comprised of four logic units.

2. Description of the Prior Art

Recently it has developed that a binary logic circuit for a computer or other arithmatic operation equipment is fabricated on an integrated circuit chip as a large scale integrated circuit (LSI). Under these conditions, it is necessary to simplify circuit construction without losing circuit functions. When insulated gate field effect transistors are used for the logic circuit, it is even more necessary to simplify the circuit constructions. In the specification, an insulated gate field effect transistor (IGFET) is meant to include a metal oxide semiconductor field effect transistor (MOSFET), so that it is herein called merely a field effect transistor (FET). Prior art devices which employed the FETs as logic circuit elements while generally satisfactory, required a large number of the FETs and difficult arrangements thereof to be fabricated in an integrated circuit. With respect to the fabricating technique, the device required such complicated interconnections of a large number of the FETs and so difficult a layout of the circuit that the chip size of the integrated circuit was large and the cost of the manufacturing the circuit increased. Moreover when the device required a large number of elements, the device required multiple stages of logic gates and accordingly the overall switching time of the device unfortunately increased.

SUMMARY OF THE INVENTION

Accordingly, one object of the present invention is to provide a new and improved unique full adder and subtractor circuit.

Another object of this invention is to provide a new and improved unique full adder and subtractor which employs insulated gate field effect transistors as an integrated circuit.

Still another object of this invention is to provide a new and improved unique full adder and subtractor circuit which is simple to fabricate with respect to number of circuit elements, interconnection of the elements, and layout of a circuit pattern.

A further object of the present invention is to provide a new and improved unique full adder and subtractor circuit which carries out high speed logic operations and consumes very little power.

Briefly, in accordance with the present invention the foregoing and other objects are in one aspect attained by providing a full adder and subtractor circuit comprising four logic units. The first logic unit carries out a logic operation on first and second operands and on information of a preceding bit to provide an output of carry information. The second logic unit carries out a logic operation on said first and second operands, said information of the preceding bit and said output of carry information to provide a result of an arithmatic operation on the first and second operands. The third logic unit carries out a logic operation on the second operand, the output of the carry information and the information of the preceding bit to provide an output of borrow information. The fourth logic unit carries out a logic operation on an operation instruction, the output of the carry information and said output of the borrow information providing information on a succeeding bit.

BRIEF DESCRIPTION OF THE DRAWING

A more complete appreciation of the invention will be readily obtained as the same becomes better understood by reference to the following detailed description when considered in connection with the accompanying drawings, wherein

FIG. 5 is a truth table of the preferred embodiment shown in FIGS. 1 and 2, FIG. 6 is a truth table of the preferred embodiment shown in FIGS. 3 and 4.

DETAILED DESCRIPTION OF THE PREFERRED EMBODIMENTS

Figure 1:
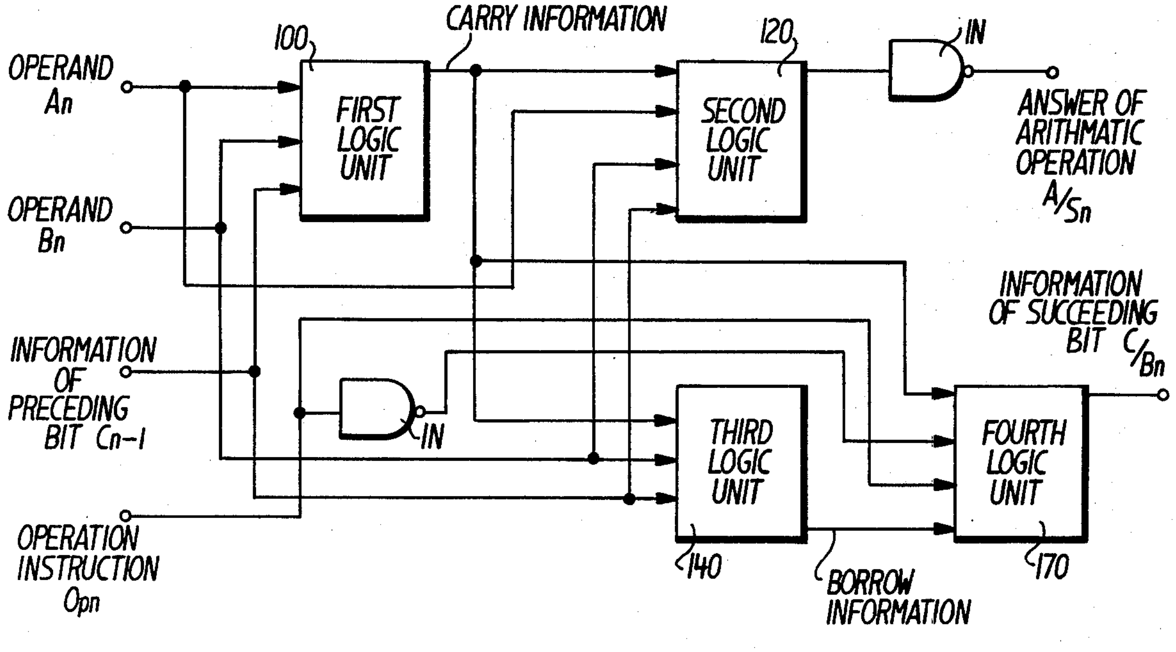
FIG. 1 is a block diagram of one preferred embodiment of the invention which has four logic units employing FETs.

Referring now to the drawings, wherein like reference numerals designate identical or corresponding parts throughout the several FIGURES, and more particularly to FIG. 1 thereof, a block diagram of a binary full adder and subtractor circuit is shown. A first logic unit 100 receives an operand signal A$n$, an operand signal B$n$ and information of a preceding bit and provides an output of a carry information. A second logic unit 120 is supplied with the output of the carry information, the operand signal A$n$, the operand signal B$n$ and information of a preceding bit and provides the answer of the arithmatic operation between the first and second operand A$n$, B$n$. A third logic unit 140 is supplied with the output signal of the carry information, an operand signal B$n$ and an information of a preceding bit and provides an output of a borrow information. A fourth logic unit 170 is supplied with the output signal of the borrow information, the output signal of the carry information and an operation instruction signal Op$n$ and its inverted signal Op$n$. The output signal of the second logic unit, called the answer, is the result of an addition or subtraction between the operand signal A$n$ and the operand signal B$n$. The output signal of the fourth logic unit, called the information of a succeeding bit, is the carrying or the borrowing signal to the succeeding bit or digit as a result of the addition or subtraction between two operands.

The first logic unit 100 comprises a one stage circuit of an AND-NOR/OR-NAND circuit so as to produce an inverted carrying signal, carry $n$, as a result of the addition between the operand A$n$ and the operand B$n$ with respect to an operation instruction signal OP$n$.

The operation is described using logic equation as follows:

$$\overline{\text{carry}n} = \overline{An.(Bn + Cn - 1) + Cn - 1.Bn}$$

The third logic unit comprises a one stage circuit of an AND-NOR/OR-NAND circuit so as to produce an inverted borrow, Borrow *n*, as the result of the subtraction operand A*n* minus the operand B*n*, $$\overline{\text{Borrow}n} = \overline{\overline{\text{carry}n}.\ (Bn + Cn - 1) + Bn.Cn - 1}$$

The second logic unit comprises a one stage circuit of an AND-NOR/OR-NAND circuit so as to produce a result A/S*n* of the addition or subtraction between the operands A*n* and B*n*, $$A/Sn = \overline{\text{carry}n}\ .(An + Bn + Cn - 1) + An.Bn.Cn - 1$$

The fourth logic unit comprises a one stage circuit of an AND-NOR/OR-NAND circuit so as to produce the information of a succeeding bit of the carrying or borrowing signal C/B*n* by switching the $\overline{\text{carry}n}$ or $\overline{\text{Borrow}n}$ by the operation instruction signal O*pn*.

$$C/Bn = \overline{\overline{Opn}\ .\ \overline{\text{carry}n} + Opn.\ \overline{\text{Borrow}n}}$$

Thus, the binary full adder and subtractor of this invention provides the same logic function as tabulated in the truth table of FIG. 5 with only a three stage AND-NOR/OR-NAND logic circuit.

Figure 2:
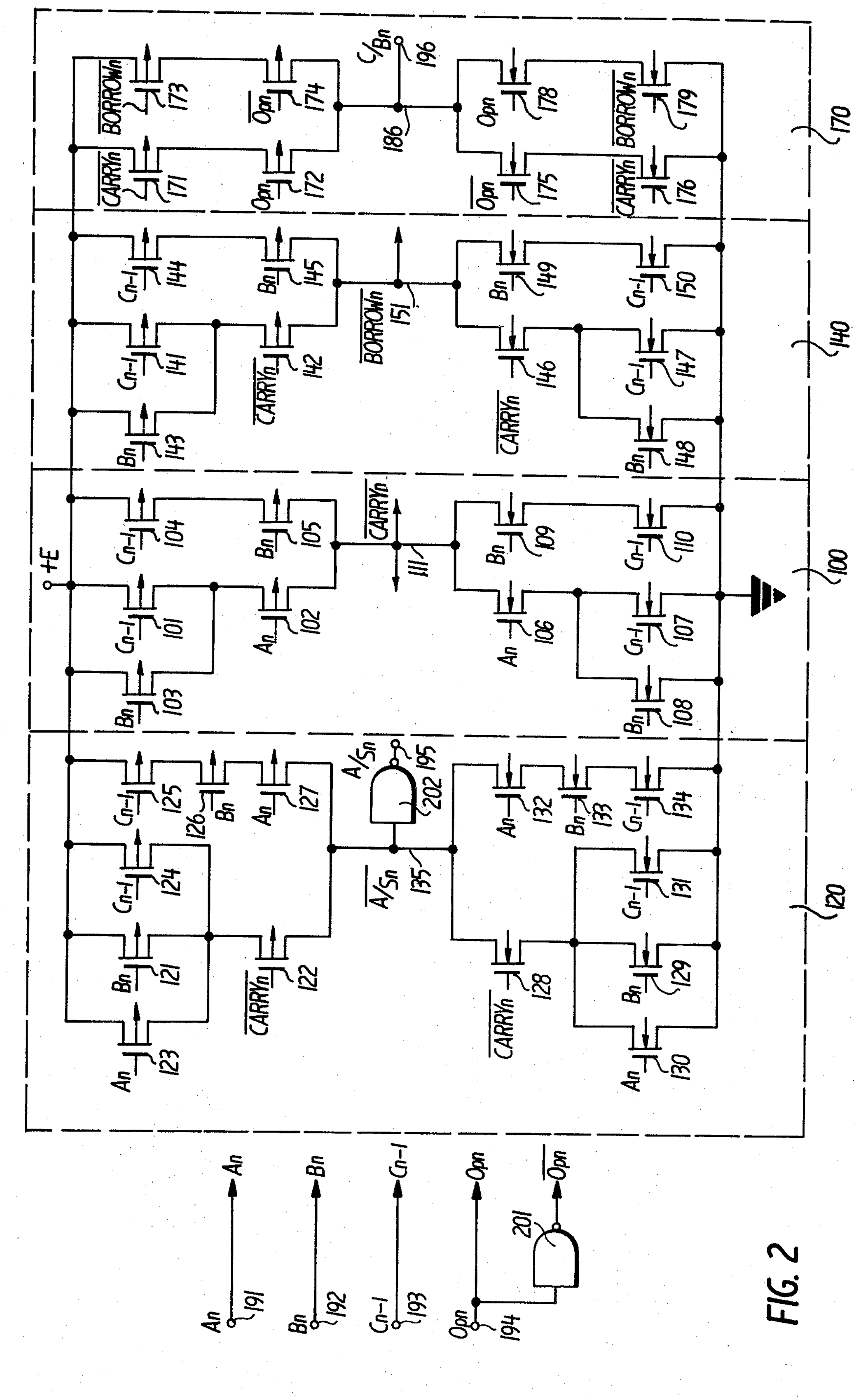
FIG. 2 is a schematic diagram of the preferred embodiment shown in FIG. 1.

Referring now to FIG. 2, a detailed circuit construction of the embodiment of FIG. 1 will be described.

As shown in FIG. 2, the first logic unit 100 comprises a series connected circuit between a positive power supply and a ground, consisting of P channel FETs 101 and 102 and N channel FETs 106 and 107, a P channel FET 103 being connected in parallel with the FET 101, an N channel FET 108 being connected in parallel with the FET 107, and another series connected circuit consisting of P channel FETs 104 and 105 and N channel FETs 109 and 110. A juncture between the FETs 102 and 106 and a juncture between the FETs 105 and 109 are commonly connected to an output point 111, point 111 denoting the inverted carry of the full adder $\overline{\text{carry}n}$.

A source electrode of the FET 101 as above defined is connected to a positive power supply +E and a drain electrode of the FET 101 is connected to a source electrode of the FET 102. A drain electrode of the FET 102 is connected to a drain electrode of the FET 106 while a source electrode of the FET 106 is connected to a drain electrode of the FET 107, a source electrode of the FET 107 being grounded.

A source electrode of the FET 103 is connected to the positive power supply +E and a drain electrode of the FET 103 is connected to the drain electrode of the FET 101. A drain electrode of the FET 108 is connected to the drain electrode of the FET 107, a source electrode of the FET 108 being grounded.

A source electrode of the FET 104 is connected to the positive power supply +E and a drain electrode of the FET 104 is connected to a source electrode of the FET 105. A drain electrode of the FET 105 is connected to a drain electrode of the FET 109 and source electrode of the FET 109 is connected to a drain electrode of the FET 110, a source electrode of FET 110 being grounded.

The juncture between the FETs 102 and 106 is connected to the juncture between the FETs 105 and 109 which is in turn connected to the output point 111.

Gate electrodes of FETs 102 and 106 are connected to an input terminal 191 which receives the operand signal A*n*, and gate electrodes of FETs 103, 105, 108 and 109 are connected to an input terminal 192 which receives the operand signal B*n*. Gate electrodes of FETs 101, 104, 107 and 110 are connected to an input terminal 193 which receives information of the preceding bit of a carrying or borrowing signal C*n* – 1 from the previous bit or digit. Furthermore, the output point 111 of the first logic unit 100 is connected directly to the inputs of the second logic unit 120, the third logic unit 140 and the fourth logic unit 170 which are described later.

The second logic unit 120 comprises a series connected circuit between the positive power supply +E and the ground consisting of P channel FETs 121 and 122 and N channel FETs 128 and 129, P channel FETs 123 and 124 being connected in parallel with the FET 121 and the N channel FETs 130 and 131 being connected in parallel with the FET 129. Another series circuit is connected between the positive power supply +E and the ground, consisting of P channel FETs 125, 126 and 127 and N channel FETs 132, 133 and 134. A juncture between the FETs 122 and 128 and a juncture between the FETs 127 and 132 are connected to an output point 135. The output point 135 is in turn connected through an inverter 202 to an output terminal 195 from which the result of an addition or subtraction A/S*n* is obtained.

A source electrode of the FET 121 is connected to the positive power supply voltage and a drain electrode thereof is connected to a source electrode of the FET 122. A drain electrode thereof is connected to a drain electrode of the FET 128 and a source electrode thereof is connected to a drain electrode of the FET 129, a source electrode thereof being grounded. Source electrodes of the FETs 123 and 124 are connected to the positive power supply and the drain electrode of the FETs 123 and 124 are connected to a drain electrode of the FET 121. Drain electrodes of the FETs 130 and 131 are connected to a drain electrode of the FET 129 and source electrodes of the FETs 130 and 131 are grounded. A source electrode of the FET 125 is connected to the positive power supply +E. A drain electrode thereof is connected to a source electrode of the FET 126 and a drain electrode thereof is connected to a source electrode of the FET 127. A drain electrode thereof is connected to a drain electrode of the FET 132 and a source electrode thereof is connected to a drain electrode of the FET 133. A source electrode thereof is connected to a drain electrode of the FEt 134 and a source electrode thereof is grounded.

A juncture between the drain electrode of the FETs 122 and 128 and a juncture between the drain electrode of the FETs 127 and 132 are connected to the output point 135. The gate electrodes of the FETs 123, 127, 130 and 132 are connected to the input terminal 191 and the gate electrodes of the FETs 121, 126, 129 and 133 are connected to the input terminal 192. The gate electrodes of the FETs 124, 125, 131 and 134 are connected to the input terminal 193. The gate electrodes of the FETs 122 and 128 are connected to the output point 111 of the first logic unit 100. The third logic unit 140 comprises a series connected circuit between the positive power supply +E and the ground consisting of P channel FETs 141 and 142 and N channel FETs 146 and 147, a P channel FET 143 being connected in parallel with the FET 141 and an N channel FET 148 being connected in parallel with the FET 147.

Another series connected circuit between the positive power supply +E and the ground consists of P channel FETs 144 and 145 and N channel FETs 149 and 150, a juncture between FETs 142 and 146 and a juncture between FETs 145 and 149 being connected to an output point 151 from which the inverted borrow signal $\overline{\text{Borrown}}$ is obtained as a result of the full subtractor.

A source electrode of the FEt 141 is connected to the positive power supply +E and a drain electrode thereof is connected to a source of the FET 142. A drain electrode thereof is connected to a drain electrode of the FET 146 and a source electrode thereof is connected to a drain electrode of the FET 147 while a source electrode thereof is grounded. A source electrode of the FET 143 is connected to the positive power supply +E and a drain electrode thereof is connected to a drain electrode of the FET 141. A drain electrode of the FET 148 is connected to a drain electrode of the FET 147 and a source electrode thereof is connected to the ground. A source electrode of the FET 144 is connected to the positive power supply +E and a drain electrode thereof is connected to a source electrode of the FET 145. A drain electrode thereof is connected to a drain electrode of the FET 149 and a source electrode thereof is connected to a drain electrode of the FET 150 and a source electrode thereof is grounded.

A juncture between the FETs 142 and 146 and a juncture between FETs 145 and 149 are connected to an output point 151.

Gate electrodes of the FETs 143, 145, 148 and 149 are connected to an input terminal 192 and gate electrodes of the FETs 141, 144, 147 and 150 are connected to an input terminal 193. Gate electrodes of the FETs 142 and 146 are connected to the output point 111 of the first logic unit 100.

The fourth logic unit 170 comprises a series connected circuit between the positive power supply +E and the ground consisting of P channel FETs 171 and 172 and N channel FETs 175 and 176 and another series circuit connected between the positive power supply and the ground consisting of P channel FETs 173 and 174 and N channel FETs 178 and 179.

A juncture between the FETs 172 and 175 and a juncture between the FETs 174 and 178 are connected to an output terminal 196, from which the output signal of carry or borrow for the succeeding bit or digit C/B*n* is obtained.

A source electrode of the FET 171 is connected to the positive power supply +E and a drain electrode thereof is connected to a source of the FET 172 and a drain electrode thereof is connected to a drain electrode of the FEt 175. A source electrode thereof is connected to a drain electrode of the FET 176 and a source electrode thereof is grounded. A source electrode of the FET 173 is connected to the positive power supply +E and a drain electrode thereof is connected to a source electrode of the FET 174. A drain electrode thereof is connected to a drain electrode of the FET 178 and a source electrode is connected to a drain electrode of the FET 179 while a source electrode thereof is grounded.

A juncture between drain electrodes of the FETs 172 and 175 and drain electrodes of the FETs 174 and 178 is connected to an output terminal 196.

Gate electrodes of the FETs 171 and 176 are connected to the output point 111 of the first logic unit. Gate electrodes of the FETs 173 and 179 are connected to the output point 151 of the third logic unit 140.

Gate electrodes of the FETs 172 and 178 are connected to the input terminal 194 which receives the operating signal $\overline{\text{O}pn}$.

The input terminal 194 is also connected through the inverter circuit 201 to gate electrodes of FETs 174 and 175. The output signal of inverter 201 becomes the inverted operating signal O*pn*.

In the above description, although a substrate electrode of each FET was not described, it should be understood that a suitable bias voltage is impressed upon the FET substrate electrodes for stabilizing the operation of each field effect transistor. Thus, for example, the substrate electrode of each N channel type FET is grounded and that of each P channel type FET is connected to the positive supply voltage terminal +E.

Each one of the inverters 201 and 202 is of a complementary FET logic circuit comprising a P channel FET 23 and N channel FET 23.

A logic operation of this circuit configuration will now be described. A logic 1 is defined as a high logic level such as +E volt and a logic 0 is defined as a low logic level such as ground level.

Logic operation corresponds to the state of the input signals impressed upon the input terminals 191, 192, 193 and 194.

First the case of A*n* = B*n* = C*n* − 1 = O*pn* = 0 level should be considered. In this case all input terminals 191, 192, 193 and 194 are impressed at ground level and the FETs 101, 102, 103, 104, 105, 121, 123, 124, 125, 126, 127, 128, 141, 143, 144, 145, 146, 172, 175, 176, 179 become conductive while the other FETs become nonconductive. The output signal A/S*n* of the terminal 195 becomes 0 and the output signal C/B*n* also becomes 0.

In the case that A*n* is at a 1 level, B*n* is at a 0 level, C*n* − 1 is at a 0 level and O*pn* is at a 0 level, the FETs 101, 103, 104, 105, 106, 121, 124, 125, 126, 128, 130, 132, 141, 143, 144, 145, 146, 172, 175, 176, 179 becomes conductive and the other FETs become nonconductive. Therefor the output signal A/S*n* of the terminal 195 is at a 1 level and the output signal C/B*n* of the terminal 196 becomes at a 0 level.

In this manner, other combinations of input signals is easily considered and as a result the truth table of FIG. 5 can be constructed.

Figure 3:
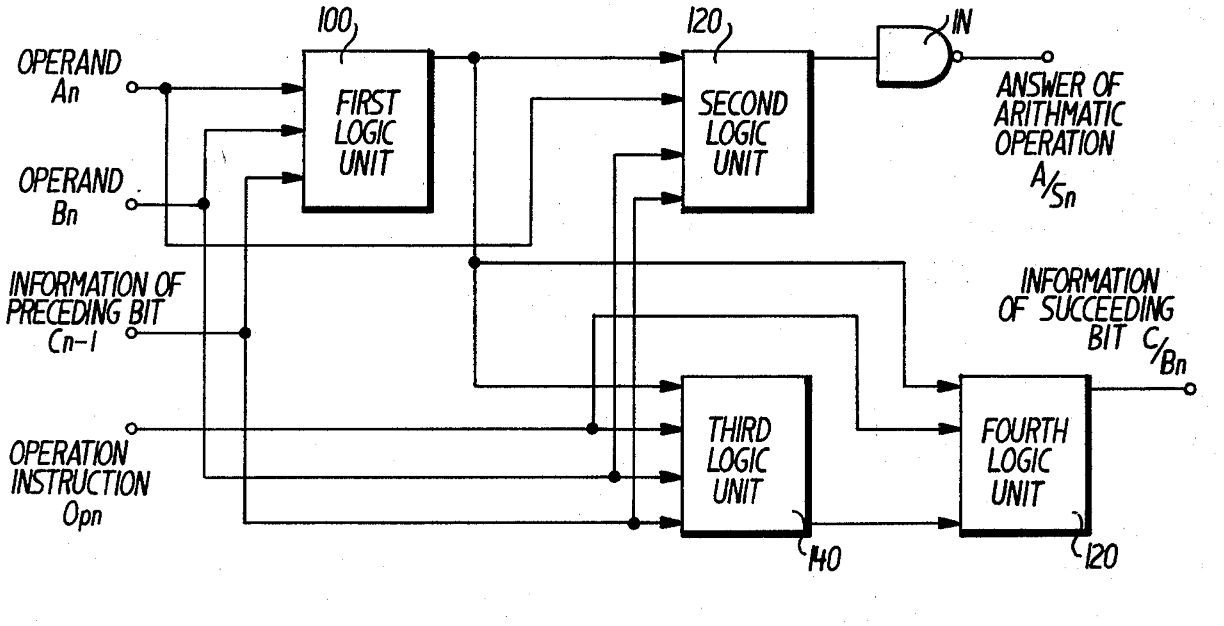
FIG. 3 is a block diagram of another preferred embodiment of the invention which does not have an inverted operation instruction.
Figure 4:
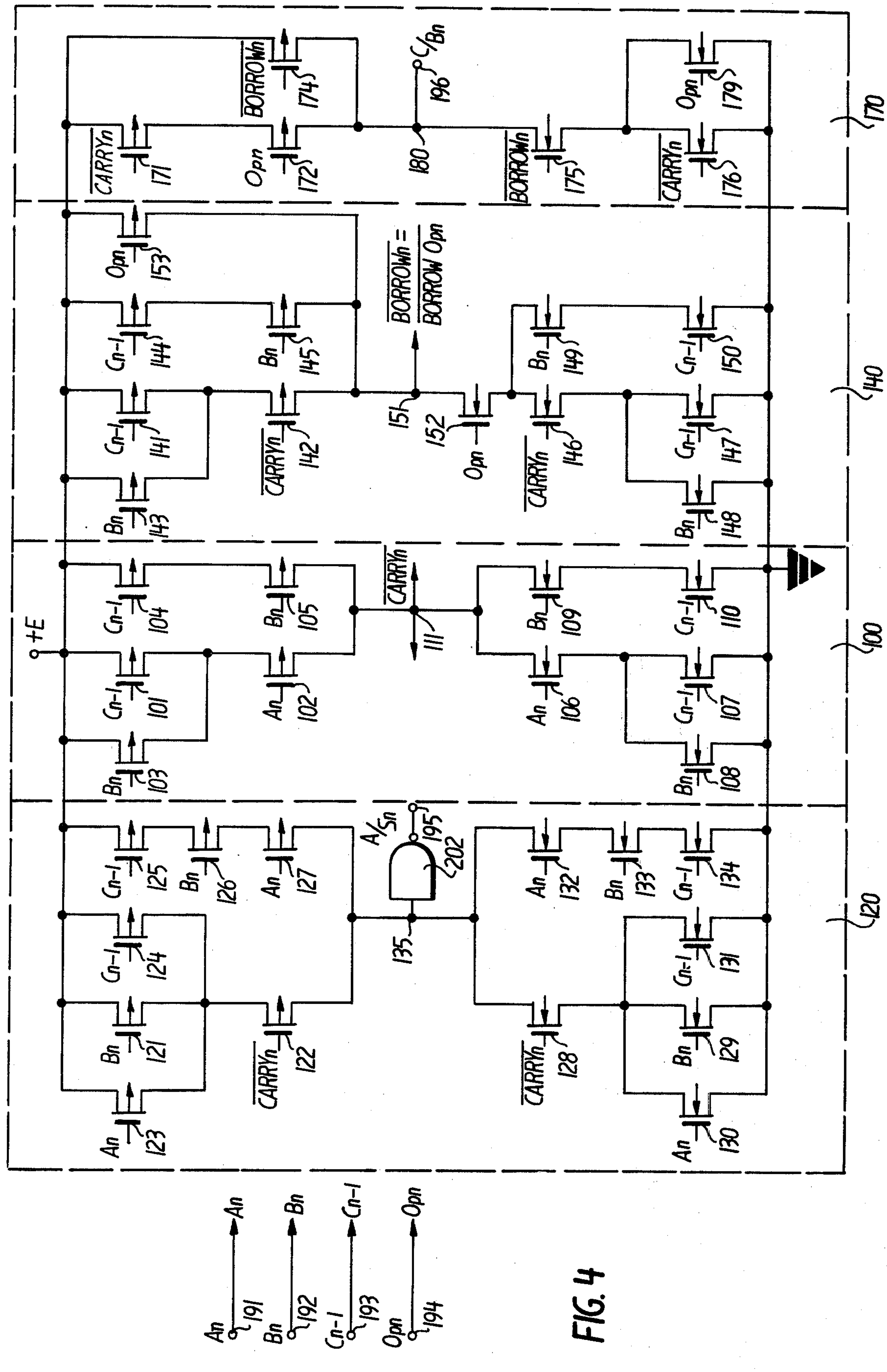
FIG. 4 is a schematic diagram of the preferred embodiment shown in FIG. 3.

The other preferred embodiment of the invention shown in FIG. 3 and FIG. 4 has same function as the first embodiment shown in FIG. 1 and FIG. 2 without the inverted operation instruction $\overline{\text{O}pn}$. The second embodiment shown in FIG. 3 and FIG. 4 does not have the inverted operation instruction $\overline{\text{O}pn}$, and accordingly, the third logic unit 140 and the fourth logic unit 170 differ from those of the first embodiment. Namely, the FET 153 and the FET 152 are added to the third logic unit 140 of the first embodiment to carry out a logic operation with the operation instruction O*pn*, and the FET 173 and the FET 178 are deleted from the fourth logic unit 170 of the first embodiment, so that the logic equation of the second embodiment is as follows:

$$\overline{\text{Carryn}} = \overline{An.\,(Bn + Cn - 1) + Cn - 1.Bn}$$

$$\text{Borrown} = \overline{\text{O}pn.(\text{carryn}.(Bn + Cn - 1) + Bn.Cn - 1)}$$

$$A/Sn = \overline{\text{Carryn}}.\,(An + Bn = Cn - 1) + An.Bn.Cn - 1$$

$$C/Bn = \overline{\overline{\text{Borrown}}.\,(\overline{\text{Carryn}} + \text{O}pn)}$$

According to the logic equation, the logic operation of the second embodiment is represented by the truth table of FIG. 6.

In this circuit configuration as shown in FIG. 2 a binary full adder-subtractor can be constructed with only 46 transistors. Moreover the connections of these transistors are symmetrical with respect to the output terminals and it uses non-inverting input signals A*n*, b*BCn* − 1, O*pn* and only one inverted signal O*pn* and it minimizes the interconnections and cross connections. Moreover the number of stages through which an input signal propagates to the output is only three so that the operating speed of the circuit is high. Furthermore, there is no direct current path between the positive power supply and ground. Therefor it maintains the low power dissipation characteristics of complimentary IGFEF circuits.

This invention is not restricted to the circuit configuration described above using both P channel FETs and N channels FETs, and is applicable to a circuit consisting of P channel or N channel FET transistors only. In this case, for instance, P channel FETs only, all N channel FETs of the circuit should be deleted and a load FET of enhancement type or depletion type should be added. It is also clear that change of the order of an FET between an output point or terminal and the positive supply or the ground yields no difference in the results.

Moreover changing of the layout of the FET between an output point or terminal and the positive power supply or ground diagonally symmetrical with the output point or terminal yields no difference in the result.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A full adder and subtractor circuit comprising:
- a first terminal for receiving a first operand signal,
- a second terminal for receiving a second operand signal,
- a third terminal for receiving an information of preceding bit signal,
- a fourth terminal for receiving an operation instruction signal,
- first logic means having an input and an output,
- second logic means having an input and an output,
- third logic means having an input and an output,
- fourth logic means having an input and an output,
- an inverter having an input and an output,
- means connecting said first operand signal to the input of said first logic means,
- means connecting said second operand signal to the input of said first logic means,
- means connecting said information of preceding bit signal to the input of said first logic means,
- means connecting said first operand signal to the input of said second logic means,
- means connecting said second operand signal to the input of said second logic means,
- means connecting said information of preceding bit signal to the input of said second logic means,
- means connecting the output of said first logic means to the input of said second logic means,
- means connecting said second operand signal to the input of said third logic means,
- means connecting said information of preceding bit signal to the input of said third logic means,
- means connecting the output of said first logic means to the input of said third logic means,
- means connecting the output of said first logic means to the input of said fourth logic means,
- means connecting said operation instruction signal to the input of said fourth logic means,
- means connecting said operation instruction signal to the input of said inverter,
- means connecting the output of said inverter to the input of said fourth logic means,
- means connecting the output of said third logic means to the input of said fourth logic means, said first logic means comprising:
- means to add said second operand signal and said information of preceding bit signal to yield a first signal,
- means to combine said first signal and said first operand signal in AND gate fashion to yield a second signal,
- means to combine said information of preceding bit signal and said second operand signal in AND gate fashion to yield a third signal,
- means to add said second signal and said third signal to form a fourth signal,
- means to invert said fourth signal to form a fifth signal,
- said fifth signal comprising the output signal of said first logic means, said second logic means comprising:
- means to add said first operand signal and said second operand signal and said information of preceding bit signal to form a sixth signal,
- means to combine said sixth signal and said fifth signal in AND gate fashion to form a seventh signal,
- means to combine said first operand signal and said second operand signal in AND gate fashion to form an eighth signal,
- means to combine said eighth signal and said information of preceding bit signal in AND gate fashion to form a ninth signal,
- means to add said seventh signal and said ninth signal to form a 10th signal,
- said 10th signal comprising the output of said second logic means, said third logic means comprising:
- means to add said second operand signal and said information of preceding bit signal to form an 11th signal,
- means to combine said 11th signal with said fifth signal in AND gate fashion to form a 12th signal,
- means to combine said second operand signal and said information of preceding bit signal in AND gate fashion to form a 13th signal,
- means to add said 12th and 13th signals in to form a 14th signal,
- means to invert said fourteenth signal to form a 15th signal,
- said 15th signal comprising the output of said third logic means, said fourth logic means comprising:
- means to combine said operation instruction signal with said 15th signal in AND gate fashion to form a 16th signal, means to combine said fifth signal with the output of said inverter in AND gate fashion to form a 17th signal, means to add said 16th and 17th signals to form an 18th signal, means to invert said 18th signal to form a 19th signal, said 19th signal comprising the output of said fourth logic means.

2. A full adder and subtractor circuit comprising:

a first terminal for receiving a first operand signal, a second terminal for receiving a second operand signal, a third terminal for receiving an information of preceding bit signal, a fourth terminal for receiving an operation instruction signal, first logic means having an input and an output, second logic means having an input and an output, third logic means having an input and an output, fourth logic means having an input and an output, means connecting said first operand signal to the input of said first logic means, means connecting said second operand signal to the input of said first logic means, means connecting said information of preceding bit signal to the input of said first logic means, means connecting said first operand signal to the input of said second logic means, means connecting said second operand signal to the input of said second logic means, means connecting said information of preceding bit signal to the input of said second logic means, means connecting the output of said first logic means to the input of said second logic means, means connecting said second operand signal to the input of said third logic means, means connecting said information of preceding bit signal to the input of said third logic means, means connecting the output of said first logic means to the input of said third logic means, means connecting said operation instruction signal to the input of said third logic means, means connecting the output of said first logic means to the input of said fourth logic means, means connecting said operation instruction signal to the input of said fourth logic means, means connecting the output of said third logic means to the input of said fourth logic means, said first logic means comprising:

means to add said second operand signal and said information of preceding bit signal to yield a first signal, means to combine said first signal and said first operand signal in AND gate fashion to yield a second signal, means to combine said information of preceding bit signal with said second operand signal in AND gate fashion to yield a third signal, means to add said second signal and said third signal to form a fourth signal, means to invert said fourth signal to form a fifth signal, said fifth signal constituting the output signal of said first logic means, said second logic means comprising:

means to add said first operand signal and said second operand signal and said information of preceding bit signal to form a sixth signal, means to combine said sixth signal and said fifth signal in AND gate fashion to form a seventh signal, means to combine said first operand signal and said second operand signal in AND gate fashion to form an eighth signal, means to combine said eighth signal and said information of preceding bit signal in AND gate fashion to form a ninth signal, means to add said seventh signal and said ninth signal to form a 10th signal, said 10th signal comprising the output of said second logic means, said third logic means comprising:

means to add said second operand signal and said information of preceding bit signal to form an 11th signal, means to combine said 11th signal and said fifth signal in AND gate fashion to form a 12th signal, means to combine said second operand signal and said information of preceding bit signal in AND gate fashion to form a 13th signal, means to add said 12th signal and said 13th signal to form a 14th signal, means to combine said operation instruction signal with said 14th signal in AND gate fashion to form a 15th signal, means to invert said 15th signal to form a 16th signal, said 16th signal comprising the output of said third logic means, said fourth logic means comprising:

means to add said fifth signal and said operation instruction signal to form a 17th signal, means to combine said 17th signal with said 16th signal in AND gate fashion to form an 18th signal, means to invert said 18th signal to form a 19th signal, said 19th signal comprising the output of said fourth logic means.

3. A full adder and subtractor circuit according to claim 1 wherein each of said logic means employs insulated gate field effect transistors.

4. A full adder and subtractor circuit according to claim 1 wherein each of said logic means comprises one stage of on AND-NOR/OR-NAND circuit.

5. A full adder and subtractor circuit according to claim 1 wherein each of said logic means comprises one stage of on OR-NAND/AND-NOR circuit.

6. A full adder and subtractor circuit according to claim 1 wherein each of said logic means employs one channel conductivity type insulated gate field effect transistor.

7. A full adder and subtractor according to claim 1 wherein each of said logic means employs a pair of complementary channel conductivity type insulated gate field effect transistors.

8. A full adder and subtractor circuit comprising:

a first terminal for receiving a first operand signal, a second terminal for receiving a second operand signal, a third terminal for receiving an information of preceding bit signal, a fourth terminal for receiving an operation instruction signal, first logic means having an input and an output, second logic means having an input and an output, third logic means having an input and an output,
fourth logic means having an input and an output,
an inverter having an input and an output,
means connecting said first operand signal to the input of said first logic means,
means connecting said second operand signal to the input of said first logic means,
means connecting said information of preceding bit signal to the input of said first logic means,
means connecting said first operand signal to the input of said second logic means,
means connecting said second operand signal to the input of said second logic means,
means connecting said information of preceding bit signal to the input of said second logic means,
means connecting the output of said first logic means to the input of said second logic means,
means connecting said second operand signal to the input of said third logic means,
means connecting said information of preceding bit signal to the input of said third logic means,
means connecting the output of said first logic means to the input of said third logic means,
means connecting the output of said first logic means to the input of said fourth logic means,
means connecting said operation instruction signal to the input of said fourth logic means,
means connecting said operation instruction signal to the input of said inverter,
means connecting the output of said inverter to the input of said fourth logic means,
means connecting the output of said third logic means to the input of said fourth logic means,
said first logic means comprising:
means to combine said second operand signal and said first operand signal in AND gate fashion to yield a first signal,
means to combine said information of preceding bit signal and said first operand signal in AND gate fashion to yield a second signal,
means to combine said information of preceding bit signal and said second operand signal in AND gate fashion to yield a third signal,
means to add said first signal, second signal and third signal to form a fourth signal,
means to invert said fourth signal to form a fifth signal,
said fifth signal comprising the output signal of said first logic means,
said second logic means comprising:
means to combine said first operand signal and said fifth signal in AND gate fashion to form a sixth signal,
means to combine said second operand signal and said fifth signal in AND gate fashion to form a seventh signal,
means to combine said information of preceding bit signal and said fifth signal in AND gate fashion to form an eighth signal,
means to combine said first operand signal, said second operand signal and said information of preceding bit signal in AND gate fashion to form a nineth signal,
means to add said sixth, seventh, eighth and nineth signal to form a 10th signal,
said 10th signal comprising the output of said second logic means,
said third logic means comprising:
means to combine said second operand signal in AND gate fashion to form a 11th signal,
means to combine said information of preceding bit signal and said fifth signal in AND gate fashion to form a 12th signal,
means to combine said second operand signal and said information of preceding bit signal in AND gate fashion to form a 13th signal,
means to add said 11th, 12th and 13th signal to form a 14th signal,
means to invert said 14th signal to form a 15th signal,
said 15th signal comprising the output of said third logic means,
said fourth logic means comprising:
means to combine said operation instruction signal with said 15th signal in AND gate fashion to form a 16th signal,
means to combine said fifth signal with the output of said inverter in AND gate fashion to form a 17th signal,
means to add said 16th and 17th signals to form an 18th signal,
means to invert said 18th signal to form a 19th signal,
said 19th signal comprising the output of said fourth logic means.

9. A full adder and subtractor circuit comprising:
a first terminal for receiving a first operand signal,
a second terminal for receiving a second operand signal,
a third terminal for receiving an information of preceding bit signal,
a fourth terminal for receiving an operation instruction signal,
first logic means having an input and an output,
second logic means having an input and an output,
third logic means having an input and an output,
fourth logic means having an input and an output,
means connecting said first operand signal to the input of said first logic means,
means connecting said second operand signal to the input of said first logic means,
means connecting said information of preceding bit signal to the input of said first logic means,
means connecting said first operand signal to the input of said second logic means,
means connecting said second operand signal to the input of said second logic means,
means connecting said information of preceding bit signal to the input of said second logic means,
means connecting the output of said first logic means to the input of said second logic means,
means connecting said second operand signal to the input of said third logic means,
means connecting said information of preceding bit signal to the input of said third logic means,
means connecting the output of said first logic means to the input of said third logic means,
means connecting said operation instruction signal to the input of said third logic means,
means connecting the output of said first logic means to the input of said fourth logic means,
means connecting said operation instruction signal to the input of said fourth logic means,
means connecting the output of said third logic means to the input of said fourth logic means,
said first logic means comprising:

means to combine said second operand signal and said first operand signal in AND gate fashion to yield a first signal, means to combine said information of preceding bit signal and said first operand signal in AND gate fashion to yield a second signal, means to combine said information of preceding bit signal and said second operand signal in AND gate fashion to yield a third signal, means to add said first signal, second signal, and third signal to form a fourth signal, means to invert said fourth signal to form a fifth signal, said fifth signal comprising the output signal of said first logic means, said second logic means comprising:

means to combine said first operand signal and said fifth signal in AND gate fashion to form a sixth signal, means to combine said second operand signal and said fifth signal in AND gate fashion to form a seventh signal, means to combine said information of preceding bit signal and said fifth signal in AND gate fashion to form an eighth signal, means to combine said first operand signal, said second operand signal and said information of preceding bit signal in AND gate fashion to form a nineth signal, means to add said sixth, seventh, eighth and nineth signal to form a 10th signal, said 10th signal comprising the output of said second logic means, said third logic means comprising:

means to combine said second operand signal, said fifth signal and said operation instruction signal in AND gate fashion to form an 11th signal, means to combine said information of preceding bit signal, said fifth signal and said operation instruction signal in AND gate fashion to form a 12th signal, means to combine said information of preceding bit signal, said second operand signal and said operation instruction signal in AND gate fashion to form a 13th signal, means to add said 11th, 12th and 13th signal to form a 14th signal, means to invert said 14th signal to form a 15th signal, said 15th signal comprising the output of said third logic means, said fourth logic means comprising:

means to combine said fifth and said 15th signal in AND gate fashion to form a 16th signal, means to combine said operation instruction signal and said 15th signal in AND gate fashion to form a 17th signal, means to add said 16th and 17th signal to form an 18th signal, means to invert said 18th signal to form a 19th signal, said 19th signal comprising the output of said fourth logic means.

10. A full adder and subtractor circuit in accordance with claim 8 wherein input signals applied to said first and second logic means are symmetrical with respect to said output.

* * * * *